United States Patent van der Burg

[11] 4,202,394
[45] May 13, 1980

[54] RECAPPED PNEUMATIC TIRE

[75] Inventor: Sjirk van der Burg, Embourg, Belgium

[73] Assignee: Uniroyal Aktiengesellschaft, Aachen, Fed. Rep. of Germany

[21] Appl. No.: 953,385

[22] Filed: Oct. 23, 1978

Related U.S. Application Data

[63] Continuation of Ser. No. 746,035, Nov. 29, 1976, Pat. No. 4,135,565.

[30] Foreign Application Priority Data

Dec. 17, 1975 [DE] Fed. Rep. of Germany ....... 2556930

[51] Int. Cl.² .......................... B60C 9/18; B60C 9/20
[52] U.S. Cl. ............................................... 152/361 R
[58] Field of Search ..... 152/361 R, 361 FP, 361 DM; 156/96

[56] References Cited

U.S. PATENT DOCUMENTS

| 3,467,161 | 9/1969 | Menell et al. | 152/361 R |
| 3,607,497 | 9/1971 | Chrobak | 156/96 |
| 3,837,387 | 9/1974 | Menough | 152/361 R |
| 4,092,196 | 5/1978 | Miller et al. | 156/96 |

Primary Examiner—Richard A. Bertsch
Attorney, Agent, or Firm—Philip Rodman

[57] ABSTRACT

A pneumatic tire having a radial carcass and at least two plies of steel cord belts as constituents of the reusable tire body has recap components that include an unvulcanized reinforcement belt comprising two spaced unconnected strips having rubberized textile cord elements oriented parallel with respect to the equatorial plane of the tire. Each strip is wound around a marginal zone of the tire under tension for at least one full winding. An unvulcanized tread strip is applied thereover. Subsequent vulcanization assures a firm bond between the recap components and the used tire body.

10 Claims, 8 Drawing Figures

RECAPPED PNEUMATIC TIRE

This application is a continuation of application Ser. No. 746,035 filed Nov. 29, 1976, now U.S. Pat. No. 4,135,565.

This invention relates to recapped pneumatic tires and more particularly to the recapping of a tire having a radial carcass and at least two plies of steel cord belts with cord angles between 10° and 30°.

It is well known that most pneumatic vehicle tires, following wearing of the tread profile, can be made reusable by a recapping process. In a typical recapping process the remnants of the original tread, no longer considered usable, are removed or stripped by peeling, roughening or any other suitable known procedure. The stripped surface of the tire is pretreated in a known manner and a new tread is placed around the tire circumference. The tread is then vulcanized to establish a firm connection with the old tire body and simultaneously provided with a new tread profile.

In a recapping process for belted tires, particular care must be taken in removing the residue of old unusable tread to prevent or minimize damage to the constituents of the original belt, especially the rubber in which the reinforcing elements of the belt are embedded, otherwise it may be necessary to rebuild the original belt on the used tire body. If desired a thin rubber ply can be applied onto the stripped surface of the used tire body to serve as a protective or compensating ply and thereafter the new tread is applied.

Generally a recapped tire, with or without reinforcing belts, is incapable of performing at the same level as the original new tire. This is due to several known factors such as inadequate bonding between the new tread and the original used tire body. Consequently, there is a tendency for the recapping material to separate from the original used tire body, especially at high speeds.

It is thus desirable to provide an improved recapped tire construction for steel belted tires and a method for recapping steel belted tires that furnishes an improved bond between the recap components and the used tire body and also furnishes a recapped tire that is capable of performing at levels equal to or higher than that of the original steel belted tire in its original new state.

Among the several objects of the present invention it may be noted the provision of a recapped pneumatic tire with steel belts having improved road behavior including better road holding ability and running accuracy even at high speeds, a recapped pneumatic tire with steel belts having improved wear resistance and travel comfort, and a recapping process that yields more reliable bonding than that previously obtained between the new tire components and a used tire body having steel belts. Other objects and features will be in part apparent and in part pointed out hereinafter.

In accordance with the present invention the recapped pneumatic tire with steel reinforcing belts includes a newly inserted reinforcing belt disposed between the steel belts in the original used tire body and the recap tread strip. The newly inserted belt includes textile cord elements that run parallel to the equatorial plane of the tire for at least one full winding around the tire circumference and preferably in two continuously running windings. If desired, the newly inserted reinforcing belt can be continuous with two spaced marginal area belts or the reinforcement can comprise spaced unconnected marginal area belts. The newly inserted reinforcing belts are sized or arranged to sufficiently cover the marginal edges of the original steel reinforcing belts.

The heat applied during vulcanization of the new tread shrinks the cord elements of the newly added belt, wherein the cord elements, in the manner of shackles, loop around the original steel belt reinforcement of the used tire body to form an integral combination therewith. The newly added reinforcing belt has an uncured elastomer or rubber layer that bonds firmly to the rubber ply of the newly applied tread during vulcanization, thereby insuring against the occurrence of any detachment phenomena along the edges of the belt during use of the recapped tire, even at elevated speeds.

The invention also relates to an improved process for recapping a used pneumatic tire having a steel reinforcing belt. In the improved recapping process a reinforcing belt formed of rubberized textile cord elements oriented parallel to the equatorial plane of the tire is applied to the stripped and prepared circumferential surface of the used tire, onto the exposed outermost steel belt ply and thereafter a new tread strip is applied onto the textile cord reinforcing belt. The recap components are then firmly connected by vulcanization with the used tire body.

The invention accordingly comprises the constructions and methods hereinafter described, the scope of the invention being indicated in the following claims.

In the accompanying drawings in which various embodiments of the invention are illustrated:

Figure 2:
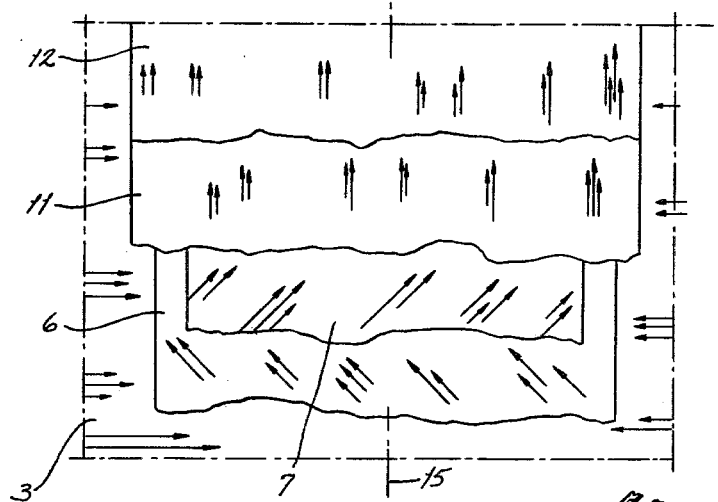
FIG. 2 is a schematic cut away plan view of the various plies thereof.

Referring now to the drawings a recapped pneumatic tire is generally indicated by reference number 1. The recapped tire 1 includes a used tire body 2 with a radial carcass 3 embedded therein. A belt 5 comprised of two plies 6 and 7 made of steel cord elements having cord angles between 10° and 30° is arranged in the crown area of the used tire body 2. The cord elements of the two plies 6 and 7 are arranged to intersect as suggested by the arrows in FIG. 2.

Figure 1:
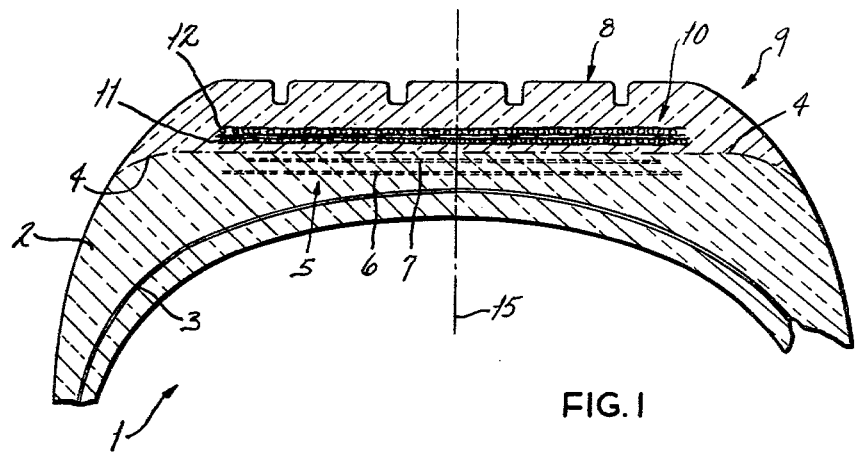
FIG. 1 shows, in fragmentary cross section, a recapped pneumatic vehicle tire incorporating one embodiment of the present invention.

The tread area of the used tire body 2 is machined prior to recapping in a known manner to remove rubber from the original tread close to the belt 5 as indicated by the dash and dot line 4 in FIG. 1. During the tread removal process, particular care is taken to avoid damaging the cord elements of the outer belt ply 7 and to leave a residue of the old rubber layer over the cord elements of the belt ply 7. Otherwise it may be necessary to rebuild the belt 7 onto the used tire body 2.

Figure 3:
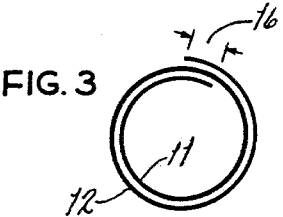
FIG. 3 is a schematic side view of a newly added reinforcement belt incorporated in the present invention.

The exposed area of the used tire body 2 is then treated in a known manner and a tire cord belt 10, comprising two continuously running windings 11 and 12 is wound thereon. The tire cord belt 10 is formed of textile cord elements embedded in rubber or the like, and oriented parallel to one another and substantially parallel to the equatorial plane 15 of the tire. Accordingly the cord elements of the tire cord belt 10 form a continuous spiral arrangement of the plies 11 and 12 as best seen in FIG. 3.

The cord belt 10 can be arranged as one or two complete windings although more than two complete windings are also feasible. Irrespective of the number of windings in the belt 10 it is desirable to have the extremities of the belt overlap as indicated at 16 (FIG. 3). Preferably the overlap 16 should be between 10 and 30 mm.

It is desirable that the textile cord elements of the tire cord belt 10 be capable of elastic longitudinal extension of approximately 1 to 5% of their length in the rest state, or a shrinkage capability upon exposure to the heat of vulcanization.

The cord elements of the tire cord belt 10 can be formed of any suitable material such as materials selected from the group of polyamides, rayon, polyesters and the like, and preferably a calendered nylon fabric ply. Fiberglass material is also feasible.

A particularly solid bond is achieved between the belt 10 and the used tire body 2 if the lowermost winding 11 of the tire cord belt 10 is in direct contact with the outermost steel belt ply 7 of the tire 1. In large size tires, for instance truck tires and other similar large wheel applications, the lowermost winding 11 of the tire cord belt 10 should make direct contact with a recap marking ply provided above the steel reinforcement belt 5.

Preferably the tire cord belt 10 is wrapped around the used tire body 2 under tension to permit a firm bond therebetween. The tire cord belt 10 is wrapped symmetrically to the equatorial plane around the steel belt reinforcement 5. The width of the tire cord belt 10 is suitably adjusted to the width of the belt 5 and may amount to between plus or minus 30 mm. of the belt width. Preferably the tire cord belt 10 has a width that permits it to extend beyond the edges of the steel belt reinforcement 5 thereby guarding against the possibility of separation phenomena in the recapped tire even at elevated speeds.

After the tire cord belt 10 is applied to the used tire body 2 the new tread 8 is applied over this assembly in a known manner and a new tread profile is embossed therein during subsequent vulcanization. Since the tire cord belt 10 comprises a rubber mass in which the cord elements are embedded the vulcanization provides particularly strong bonding between the belt 10 and the new tread 8 as neither one has been vulcanized prior to the recapping process.

The extremely firm bonds between the tire cord belt 10 and the used tire body 2, between the tire cord belt 10 and the new tread 8, and between the new tread 8 and the used tire body 2 assures a greater molding accuracy during vulcanization of the new tire components in comparison with prior known tires of this type. Consequently the recapped tire exhibits improved running performance and a lesser degree of wear. Moreover the recapped tire is endowed with properties that were originally nonexistent or partially nonexistent in the used tire when it was in its new condition, such as improved road holding ability and improved travel comfort.

If desired a thin rubber ply (not shown) can be applied onto the pretreated used tire body 2 at the surface 4 prior to application of the tire cord belt 10 to serve as a protection or compensation ply.

Figure 4:
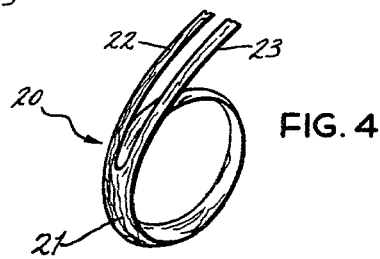
FIG. 4 is a schematic perspective view of a newly added reinforcement belt having a length thereof subdivided into marginal belt portions.

It may also be desirable to use tire cord strips in the marginal zones to cover and firmly bond the belt edges. For example a single piece tire cord strip 20 (FIG. 4) applied in one full winding and consisting from that point on of narrow strips 22 forming a continued winding can be used.

While a textile tire cord ply embracing a belt ply on the outside and having cord elements oriented parallel to the equatorial plane is a known arrangement in new tires, the incorporation of a separate unvulcanized tire cord belt, with more than one winding and having overlapping end portions and a separate unvulcanized tread strip in a recapping process for pneumatic tires having steel belts has heretofore not been known. Such an arrangement in a recapped tire having steel reinforcing belts as disclosed herein serves a double function in providing an improved bond between the used original and the new portions of the tire, and at the same time endows the recapped tire with desirable properties that did not exist with the original tire even when the original tire was in its new state.

Figure 5:
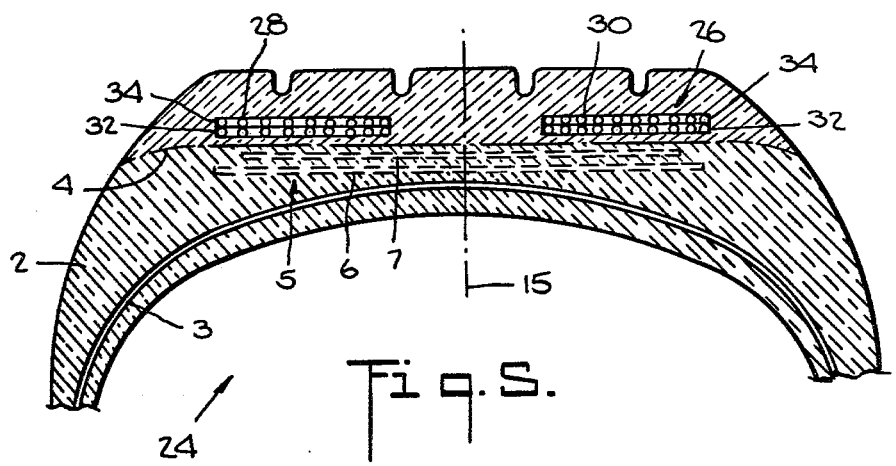
FIGS. 5-8 relate to another embodiment of the invention and respectively correspond to FIGS. 1-4.
Figure 6:
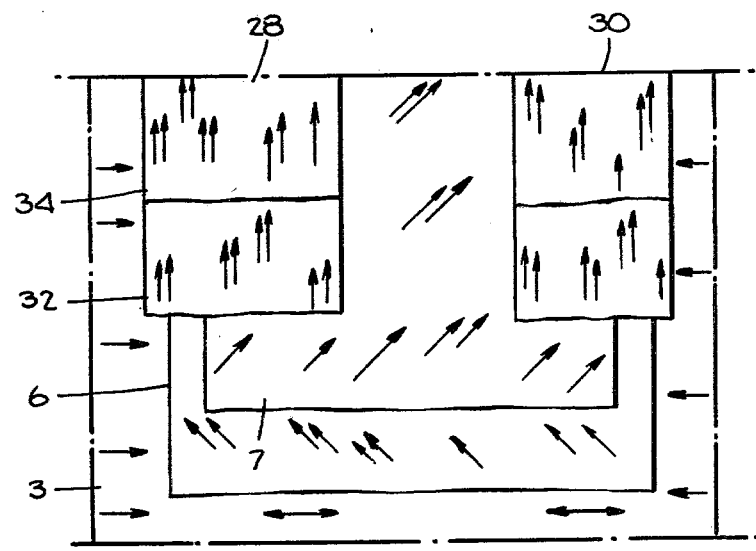

Another embodiment of the invention is incorporated in a recapped pneumatic tire generally indicated by reference number 24 in FIG. 5. Those portions of the pneumatic tire 24 which correspond to the pnuematic tire 1 are indicated by corresponding reference numbers. The tire 24 is prepared for retreading in the manner previously described with respect to the tire 1.

A tire cord belt 26 comprising individual unconnected unvulcanized narrow tire cord strips 28 and 30 is wound upon the exposed area of the used tire body 2. The strips 28 and 30 are substantially identical, and each include two continuously running windings 32 and 34.

Figure 7:
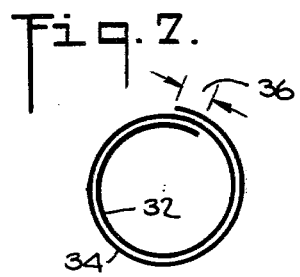
Figure 8:
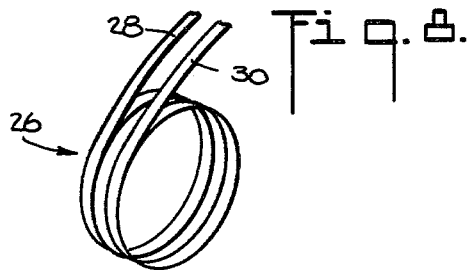

The strips 28 and 30 are formed of textile cord elements of the type described for the belt 10, such as nylon, and have the same prevulcanization elongation and post-vulcanization shrinkage capabilities as described for the belt 10. The cord elements in the strips 28 and 30 are embedded in rubber or the like, and oriented parallel to the equatorial plane 15 of the tire to form a continuous spiral arrangement as best seen in FIG. 7.

Although more than two complete windings of the strips 28 and 30 are feasible, a single winding can also be used. However, irrespective of the number of windings of the strips 28 and 30, it is desirable to have the extremities overlap as indicated at 36, preferably by an amount ranging between 10 mm and 30 mm.

The strips 28 and 30 are bonded to the used tire body 2 with the lowermost windings 32 in direct contact with outermost steel ply 7 of the tire 24. In large size tires a recap marking ply can be provided between the outermost steel ply 7 and the windings 32,32 of the strips 28 and 30. Preferably the strips 28 and 30 overlap the marginal edges of the tire cord belt 26 by approximately 30 mm.

Under this arrangement the edge zone of the belt ply band 7 is provided with a firmly bonded covering that helps prevent breaker edge separations and wire corrosion. The tire 24 is thus endowed with improved road holding ability and wear resistence, increased driving comfort and higher speed capabilities.

Some advantages of the present invention evident from the foregoing description are a recapped tire that, compared with the used tire in its original state, displays an improved road holding ability and improved travel comfort. The recapping process imparts to the tire considerably greater protection against separation phenomena at the belt edges by virtue of an improved bond. Moreover since the tire can be recapped with greater accuracy it provides substantially improved wear resistance and performs more favorably even during high speed travel.

In view of the above it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A recapped pneumatic tire construction comprising a used tire body having a radial carcass and a first circumferential reinforcement belt formed with steel cords at angles between 10° and 30°, a stripped circumferential recapping surface at the periphery of said used tire body, a second reinforcement belt wound under a predetermined tension around said recapping surface for at least one full winding in spiral arrangement to provide overlapping end portions, said second reinforcement belt comprising spaced, unconnected marginal strips overlapping the marginal edges of said first reinforcement belt and being unvulcanized and including heat shrinkable rubberized textile cord elements having a predetermined shrinkage at vulcanization temperatures, said textile cord elements being oriented parallel to the equatorial plane of the tire, and an unvulcanized trend strip applied around said recapping surface over said second reinforcement belt.

2. A recapped pneumatic tire construction as claimed in claim 1 wherein the marginal strips of said second reinforcement overlap said first reinforcement by approximately 30 mm.

3. A recapped pneumatic tire construction as claimed in claim 1 wherein the overlapping end portions of said second reinforcement overlap approximately 10 to 30 mm.

4. A recapped pneumatic tire construction as claimed in claim 1 wherein the textile cords of said second reinforcement are formed of rayon.

5. A recapped pneumatic tire construction as claimed in claim 1 wherein the textile cords of said second reinforcement are formed of nylon.

6. A recapped pneumatic tire construction as claimed in claim 1 wherein the textile cords of said second reinforcement are formed of fiberglass.

7. A recapped pneumatic tire construction as claimed in claim 1 wherein said first reinforcement comprises two plies and wherein the angular orientation of cords in one of said plies intersects with the angular orientation of cords in the other said ply.

8. A recapped pneumatic tire construction as claimed in claim 1 wherein a residue of used tire rubber is left on said used tire body between said first reinforcement belt and said stripped circumferential recapping surface.

9. A recapped pneumatic tire construction as claimed in claim 1 wherein the rubberized textile cord elements of the second reinforcement are longitudinally elongated by 1 to 5% with respect to their rest position to establish said predetermined winding tension around said recapping surface.

10. A recapped pneumatic tire as claimed in claim 1 wherein said second reinforcement is disposed on said tire body symmetrical with respect to the equatorial plane of said tire.

* * * * *

UNITED STATES PATENT AND TRADEMARK OFFICE
CERTIFICATE OF CORRECTION

PATENT NO. : 4,202,394
DATED : May 13, 1980
INVENTOR(S) : SJIRK VAN DER BURG

It is certified that error appears in the above-identified patent and that said Letters Patent are hereby corrected as shown below:

Column 5, line 32, change "trend" to --tread--.

Signed and Sealed this

Seventh Day of October 1980

[SEAL]

Attest:

SIDNEY A. DIAMOND

Attesting Officer

Commissioner of Patents and Trademar